A. B. BROLUSKA.
ADJUSTING MEMBER FOR CAR BRAKES.
APPLICATION FILED JAN. 31, 1914.

1,118,915.

Patented Dec. 1, 1914.

WITNESSES:
L. S. Woodhull
L. M. Spencer

INVENTOR
Amel B. Broluska.
BY
Edward N. Pagelsen
ATTORNEY

UNITED STATES PATENT OFFICE.

AMEL B. BROLUSKA, OF DETROIT, MICHIGAN.

ADJUSTING MEMBER FOR CAR-BRAKES.

1,118,915.

Specification of Letters Patent.

Patented Dec. 1, 1914.

Application filed January 31, 1914. Serial No. 815,696.

*To all whom it may concern:*

Be it known that I, AMEL B. BROLUSKA, a citizen of the United States, and a resident of Detroit, in the county of Wayne and State of Michigan, have invented a new and Improved Adjusting Member for Car-Brakes, of which the following is a specification.

This invention relates to a member for adjusting brake beams or shoes on vehicles, and its objects are to provide a device of this character wherein a positive adjustment may be secured to either lengthen or shorten the member; one wherein the adjusting means is relieved of all stress incident to the ordinary use of the brake beams or shoes; and one wherein the adjustable parts are protected from snow, mud and other foreign matter.

To accomplish the objects mentioned, this invention consists in a pair of telescoping members, means for adjusting them in respect to each other, and means for securing them in adjusted relation. It also consists in the novel details of construction shown and described and particularly pointed out in the claims.

Figure 1:
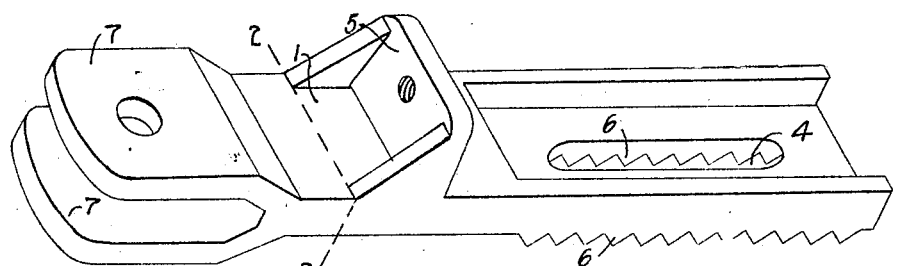
Figure 4:
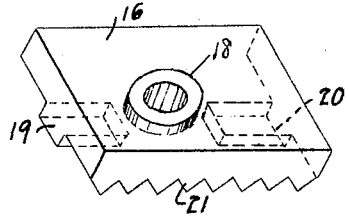
Figure 2:
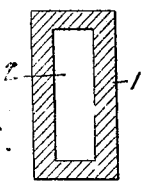
Figure 3:
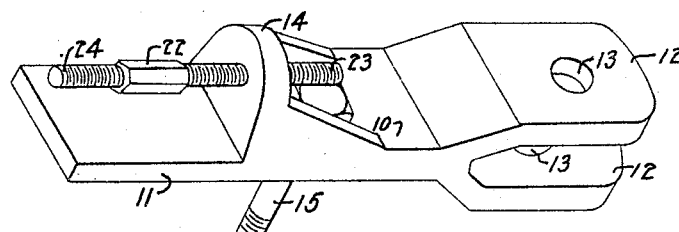
Figure 5:
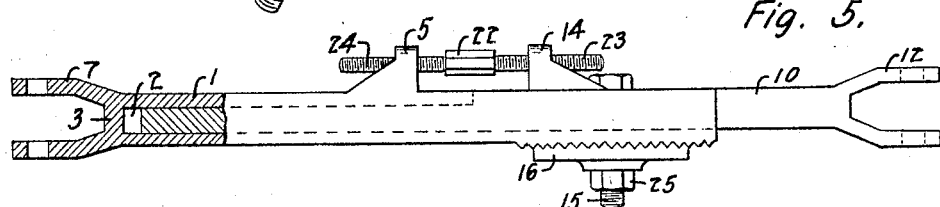
Figure 6:
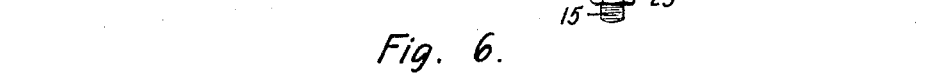
Figure 7:
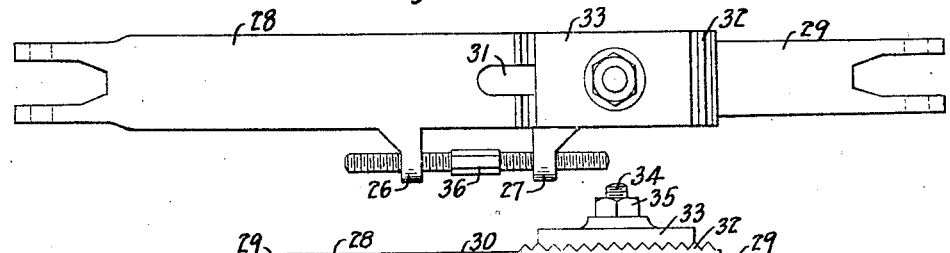

In the drawings, Figure 1 is a perspective view of one of the main members of the device. Fig. 2 is a section of Fig. 1 on the line 2—2. Fig. 3 is a perspective of the other main member, also showing the connecting bolts used therewith. Fig. 4 is a perspective of a connecting block. Fig. 5 is a side elevation of the parts in assembled position, a portion of one end being broken away. Fig. 6 is a bottom plan view of a modification. Fig. 7 is a side elevation of a portion of Fig. 6.

Similar reference characters refer to like parts throughout the several views.

The main member shown in Figs. 1 and 5 comprises a rectangular body portion 1 having an opening 2 therein (Fig. 5), one end of which is preferably closed by a wall 3. The opposite end is open at the top as shown in Fig. 1, and the bottom is slotted at 4 for a purpose hereinafter indicated. Projecting from the upper surface of this member is the threaded lug 5, and projecting from the lower surface of the slotted portion are the transverse teeth or corrugations 6. The other end of this member may be provided with the perforated bifurcations 7 that are spaced apart sufficiently to allow the insertion of some connecting link of the brake mechanism (not shown) which may be retained therein by a bolt passing through the perforations.

The main member shown in Fig. 3 comprises a rectangular body portion 10, one end 11 of which may be reduced in thickness to correspond to the opening 2 in the member 1, the opposite end being provided with the spaced bifurcations 12 having the alined openings 13, through which a bolt (not shown) may be inserted for the purpose of attaching this member to another link of the brake mechanism (not shown) therein. This member is also provided with an upstanding threaded lug 14 and with an opening through which a bolt 15 may be passed, said opening being in alinement with the slot 4 when this adjusting device is assembled.

The connecting block 16 preferably comprises a rectangular body portion 17 having upon its upper surface (Fig. 4) a perforated boss 18, its lower surface being provided with the alined lugs 19 and 20, that are of a width slightly less than that of the slot 4 in the member 1, and with the transverse teeth or corrugations 21 corresponding to the corrugations 6 in the member 1. It will be understood that the end 11 of the member 10 is slipped into the opening 2 in the member 1, and that the threaded lugs 5 and 14 are joined by the bolt 22 having the right and left hand threads 23 and 24 thereon. When the bolt has been turned to bring the members into the desired relation to each other, the connecting block is placed in the proper position, the corrugations 21 registering with the corrugations on the member 1, and the lugs 19 and 20 inserted into the slot 4, after which the bolt 15 is passed through the openings in the member 10, the slot in the member 1, and through the opening in the connecting block. The parts are then rigidly secured together by the nut 25. Any longitudinal stress applied to either end of the member will be transmitted through the bolt 15, thereby relieving the threads of the adjusting bolt 22 of the wear to which they would otherwise be subjected. At the same time, the adjusting bolt affords a means for thrusting the main members apart longitudinally, or for drawing them together at will.

The modifications shown in Figs. 6 and 7 differs from the form previously described mainly in the arrangement of the lugs 26 and 27 which project, respectively, from the sides of the main members 28 and 29, whereas the lugs 5 and 14 project from the top of the corresponding main members. In order to provide clearance for the lug 27, the side of the main member 28 is cut away as indicated at 30, and this member is further provided with a slot 31 (that is formed in both the upper and the lower wall thereof) and with the transverse corrugations 32 corresponding to the corrugations 6 of the member 1. A connecting block 33, bolt 34 and nut 35, that may be duplicates of the block 16, bolt 15 and nut 25 previously described, may be used to secure the main members rigidly together, and a right and left threaded bolt 36, similar to the bolt 22, serves to adjust the members longitudinally in respect to each other.

While I have shown and described specific embodiments of my invention, I do not desire to be limited otherwise than as indicated in the subjoined claims, as it is clear that various changes may be made in the construction without departing from the spirit of my invention.

What I claim is:—

1. In a device for adjusting brake beams or brakes on vehicles, a main member having a longitudinal opening therein, a second main member slidable in the opening, means for adjusting the main members longitudinally in respect to one another to lengthen or shorten the device, said means comprising a threaded lug on each of the main members, each lug being integral with the respective main member, a threaded bolt one end of which engages with the threaded lugs on one of the main members and the other end of which engages with the threaded lugs on the other main member, and separate means for rigidly securing the main members in any predetermined position of adjustment.

2. In a device of the character described, a main member having a longitudinal opening and a longitudinal slot therein, a second main member slidable longitudinally in the opening in the first main member, a threaded lug on each of the main members, a threaded bolt engaging with the threads on each of the lugs whereby the main members may be forced apart or drawn together longitudinally to lengthen or shorten the device, said second main member having a transverse opening therein in alinement with the slot in the first main member, and a bolt passing through the opening and the slot for rigidly securing the members in any position of adjustment.

3. In a device of the character described, a main member having a longitudinal opening and a longitudinal slot therein and having corrugations formed on its surface, a second main member slidable longitudinally in the opening in the first main member, means for adjusting the main members longitudinally in respect to each other comprising a threaded lug on each of the members, a threaded bolt one end of which engages with the threaded lug on one of the main members and the other end of which engages with the threaded lug on the other main member, a perforated block having corrugations thereon registering with the corrugations on the first main member, and a bolt passing through an opening in the second main member, the slot in the first main member and the perforation in the block, whereby the parts are rigidly secured together in any position of adjustment.

4. In a device of the character described, a main member having a longitudinal opening and a longitudinal slot therein and having corrugations formed on its surface, a second main member slidable longitudinally in the opening in the first main member, means for adjusting the main members longitudinally in respect to each other comprising a threaded lug on each of the members, a threaded bolt one end of which engages with the threaded lug on one of the main members and the other end of which engages with the threaded lug on the other main member, a perforated block having corrugations thereon registering with the corrugations on the first main member, and having a lug thereon projecting into the slot in the first main member, and a bolt passing through an opening in the second main member, the slot in the first main member and the perforation in the block, whereby the parts are rigidly secured together in any position of adjustment.

5. In a device of the character described, a main member having a longitudinal opening therein, a second main member slidable longitudinally in the opening in the first main member, one of the members having a slot therein, the other member having a transverse opening therein, one of the main members having corrugations formed upon its surface, a perforated block having corrugations thereon registering with the corrugations on the main member, a bolt passing through the opening in the one main member, through the slot in the other main member, and through the perforation in the block whereby the members may be rigidly secured together in any position of adjustment, and means whereby the members may be thrust longitudinally of each other to either lengthen or shorten the device.

6. In a device of the character described, a main member having a longitudinal opening therein, a second main member slidable longitudinally in the opening in the first main member, one of the members having a slot therein, the other member having a transverse opening therein, one of the main members having corrugations formed upon its surface, a perforated block having corrugations thereon registering with the corrugations on the main member, a bolt passing through the transverse opening in the one main member, through the slot in the other main member, and through the perforation in the block whereby the members may be rigidly secured together in any position of adjustment, means whereby the members may be thrust longitudinally of each other to either lengthen or shorten the device, said means comprising a threaded lug upon each of the main members, and a threaded bolt the ends of which engage with the threads on the lugs, said bolt having right and left handed threads.

In testimony whereof I have signed this specification in the presence of two subscribing witnesses.

AMEL B. BROLUSKA.

Witnesses:
 EDWARD N. PAGELSEN,
 HUGO W. KREINBRING.